United States Patent
Stamler (10) Patent No.: US 9,697,479 B2
(45) Date of Patent: Jul. 4, 2017

(54) PRE-BOARDING AUCTION SYSTEM FOR AIRLINE SEAT UPGRADES

(71) Applicant: SeatBoost LLC, Los Angeles, CA (US)

(72) Inventor: Kevin M. Stamler, Los Angeles, CA (US)

(73) Assignee: SeatBoost LLC, Los Angeles, CA (US)

( * ) Notice: Subject to any disclaimer, the term of this patent is extended or adjusted under 35 U.S.C. 154(b) by 0 days.

(21) Appl. No.: 13/926,985

(22) Filed: Jun. 25, 2013

(65) Prior Publication Data

US 2014/0006070 A1    Jan. 2, 2014

Related U.S. Application Data

(60) Provisional application No. 61/665,122, filed on Jun. 27, 2012.

(51) Int. Cl.
G06Q 10/02 (2012.01)
G06Q 30/08 (2012.01)

(52) U.S. Cl.
CPC .............. *G06Q 10/02* (2013.01); *G06Q 30/08* (2013.01)

(58) Field of Classification Search
USPC ........ 705/5, 6, 7.11, 14.1–14.73, 16, 20, 22, 705/26.1–30, 37, 39, 400
See application file for complete search history.

(56) References Cited

U.S. PATENT DOCUMENTS

| | | |
|---|---|---|
| 4,845,625 A | 7/1989 | Stannard |
| 5,897,620 A | 4/1999 | Walker et al. |
| 6,112,185 A | 8/2000 | Walker et al. |
| 6,963,856 B2 | 11/2005 | Lutnick et al. |
| 7,225,151 B1 | 5/2007 | Konia |
| 7,418,409 B1 | 8/2008 | Goel |
| 7,461,022 B1 | 12/2008 | Churchill et al. |
| 7,523,063 B2 | 4/2009 | Harrington et al. |
| 7,752,114 B2 | 7/2010 | Sakai |

(Continued)

OTHER PUBLICATIONS

Walton, J., "Etihad's new "PlusGrade" bid-for-upgrade system: how it works," Australian Business Traveller, Jun. 12, 2012, 6 pages, [online][retrieved on Aug. 14, 2013] Retrieved from the internet <URL:http://www.ausbt.com.au/etihad-s-new-plusgrade-bid-for-upgrade-system-how-it-works>.

(Continued)

*Primary Examiner* — Tonya Joseph
(74) *Attorney, Agent, or Firm* — Fenwick & West LLP (57) ABSTRACT

A system for upgrading airline seats during an online pre-boarding auction that is accessible through travelers' mobile devices. The auction starts at or after check-in but prior to the boarding of a flight. During the auction, travelers that have confirmed reservations for an airline flight are permitted to bid on one or more seat upgrades through their mobile devices. For example, the travelers may be bidding on upgrades from economy to first class, and the bids may be submitted through bidding applications installed on the travelers' mobile devices. The auction can be a live auction that updates the travelers on the status of the auction and receives bids from the travelers throughout the auction. The auction ends prior to boarding, and the winning travelers are sent upgrade confirmations, such as scannable boarding codes that can be used as boarding passes when boarding the flight.

20 Claims, 7 Drawing Sheets

(56) References Cited

U.S. PATENT DOCUMENTS

| | | | |
|---|---|---|---|
| 7,957,987 B2* | 6/2011 | Langerman | G06Q 10/02 705/5 |
| 8,015,073 B2 | 9/2011 | Ilechko et al. | |
| 8,121,927 B2 | 2/2012 | Kim | |
| 8,145,536 B1 | 3/2012 | Goel | |
| 8,428,620 B2* | 4/2013 | Sweeney et al. | 455/456.3 |
| 2002/0022896 A1 | 2/2002 | Dugan | |
| 2002/0161689 A1 | 10/2002 | Segal | |
| 2004/0220821 A1 | 11/2004 | Ericsson et al. | |
| 2005/0004820 A1 | 1/2005 | LeMieux | |
| 2005/0027637 A1 | 2/2005 | Kohler | |
| 2007/0055577 A1 | 3/2007 | Ashton | |
| 2010/0076826 A1 | 3/2010 | Bayne | |
| 2010/0145742 A1* | 6/2010 | Carey et al. | 705/5 |
| 2010/0293068 A1* | 11/2010 | Drakoulis | G06Q 40/04 705/26.3 |
| 2011/0077983 A1* | 3/2011 | Hua et al. | 705/5 |
| 2011/0137692 A1* | 6/2011 | Sethna | 705/5 |
| 2011/0145087 A1 | 6/2011 | Daman et al. | |
| 2011/0166899 A1 | 7/2011 | Sethna | |
| 2011/0173073 A1* | 7/2011 | Wang et al. | 705/14.58 |
| 2012/0296760 A1* | 11/2012 | Smith et al. | 705/26.3 |

OTHER PUBLICATIONS

AirTravelGenius.com, "How to Buy a Cheap Airline Upgrade," 3 Pages [online] [Archived on Web.archive.org on Feb. 9, 2012] [Retrieved on Aug. 15, 2013] Retrieved from the Internet <URL:http://web.archive.org/web/20120209145625/http://www.airtravelgenius.com/ar/cheap-airline-upgrades.htm>.

* cited by examiner

PRE-BOARDING AUCTION SYSTEM FOR AIRLINE SEAT UPGRADES

CROSS REFERENCE TO RELATED APPLICATIONS

The application claims the benefit of and priority from U.S. provisional application No. 61/665,122, titled "A cross-device platform to administer auctions of airline upgrades prior to departure" filed on Jun. 27, 2012, the contents of which are incorporated by reference herein in its entirety.

BACKGROUND

1. Field of the Disclosure

The present disclosure relates to online auctions, and more specifically to an online, live, pre-boarding auction system for seat upgrades on airline flights that can be accessed by travelers through their mobile devices.

2. Description of the Related Art seats on airlines are divided into different travel classes, such as economy class, business class and first class. Oftentimes the first and business class seats are unsold and represent lost revenue if they are empty after takeoff. Many airlines reward loyal customers by upgrading them to first or business class if seats are available, but that does not produce any additional revenue for the airline; in fact, these "free" upgrades cost airlines revenue because of the extra amenities (e.g., free food and drink given to these passengers) that upgraded passengers consume without having paid for in the seat price.

One system attempts to sell seat upgrades only after the passengers have already boarded, and during the course of the flight, but this inefficient because once passengers are seated (with their bags stowed, etc.) they are less likely to relocate to another seat, and to the extent that they are willing, they tend to offer lower amounts—essentially lowball bidding on the off chance they win the upgrade. Further, moving passengers after they are already seated can be disruptive to other passengers and may result in delays in takeoff.

Some airlines offer upgrades at check-in for a fixed price (i.e., non-auction), but relatively few, if any, passengers actually purchase these upgrades

SUMMARY

A computer system and computer implemented method for an online pre-boarding auction for upgrading airline seats. The computer system operates in conjunction with mobile devices of travelers, who can be (but not necessarily) within the airport (e.g., boarding area) at the time the auction commences and use their mobile devices to interactively participate in the auction, which can be a live auction. In one embodiment, flight authentication information, such as a confirmation code, is received by the computer system from the mobile device of the traveler. The system uses the flight authentication information to identify an airline flight that the traveler has a reservation for but has yet to board. The system notifies the traveler of an upcoming online pre-boarding auction for seat upgrade(s) by transmitting notification information to the mobile device of the traveler. This is done for any number of travelers who are on this same flight and who are using the system, such that at the time the auction commences (or is underway) there are a plurality of travelers who are potentially bidders on the seat upgrades. The system also determines how many seat upgrades are available for a flight, and the number of seat upgrades may be set by an airline that releases seats for auction.

The system commences the live auction during a pre-boarding period of time, and ends the auction prior to the start of boarding. In various embodiments the auction begins on or after check-in time for a flight (i.e. 24 hours before departure). In one embodiment the start time is 3 hours before boarding and ends 5 minutes before boarding. Because airlines recommend that travelers check in at least 1 hour before their flight time (2 hours for international flights), and typically require that baggage be checked by 30-45 minutes beforehand, this last embodiment generally ensures that the interested travelers will be in the airport and either at, or on their way to, the boarding gate. By terminating the auction before boarding begins, the airline can have time to update its seat assignment information so that travelers can take their upgraded seats directly, without having to relocate after the flight begins.

During the online pre-boarding auction, the system receives a plurality of bids for the seat upgrade(s) from the mobile devices of the interested travelers. The auction may be a live auction in which bidders see the bids of at least some of the other travelers (e.g., the highest bids) in real time and can continue to increase their bid if they are outbid, up until the auction is ends. There may be several seat upgrades available for auction that are all bid on at the same time through the same auction. Because the bids are received through mobile devices, the auction is easily accessible to the travelers and bidding can continue until the flight is about to board, or when an airline wants to end the bidding.

The system determines which traveler(s) are the winner, based on having the highest bid(s). If multiple seats upgrades were available during the auction, there can be multiple winners of the seat upgrades. The system transmits to the mobile devices of the winners, respective confirmation information confirming the seat upgrade and the winning bid amount. The system executes a payment against the traveler's payment source (e.g., credit card). The system further transmits a notification to a flight data system that identifies the traveler, and may include seat assignment information. With this information the airline can check in the traveler as he or she boards the airplane, enabling the traveler to go directly to their upgraded seat. This improves boarding efficiency compared to previous post-boarding upgrade methods.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

In the following description, numerous specific details are set forth to provide thorough explanation of embodiments of the present disclosure. It will be apparent, however, to one skilled in the art, that embodiments of the present disclosure may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the disclosure. The appearances of the phrase "in one embodiment" in various places in the specification do not necessarily all refer to the same embodiment. References to entities in the singular should be understood to encompass the plural, as appropriate for the context. It is noted that wherever practicable similar or like reference numbers may be used in the figures and may indicate similar or like functionality.

The processes depicted in the figures that follow are performed by processing logic that comprises hardware (e.g., processors, circuitry, dedicated logic, etc.), executing software that configures the hardware to perform the described functionality. Although the processes are described below in terms of some sequential operations, it should be appreciated that some of the operations described may be performed in different order. Moreover, some operations may be performed in parallel rather than sequentially. Finally, one of skill in the art appreciates that all embodiments of the invention are inherently and necessarily executed by a computer device, and are not performed in the human mind by mental steps.

Figure 1:
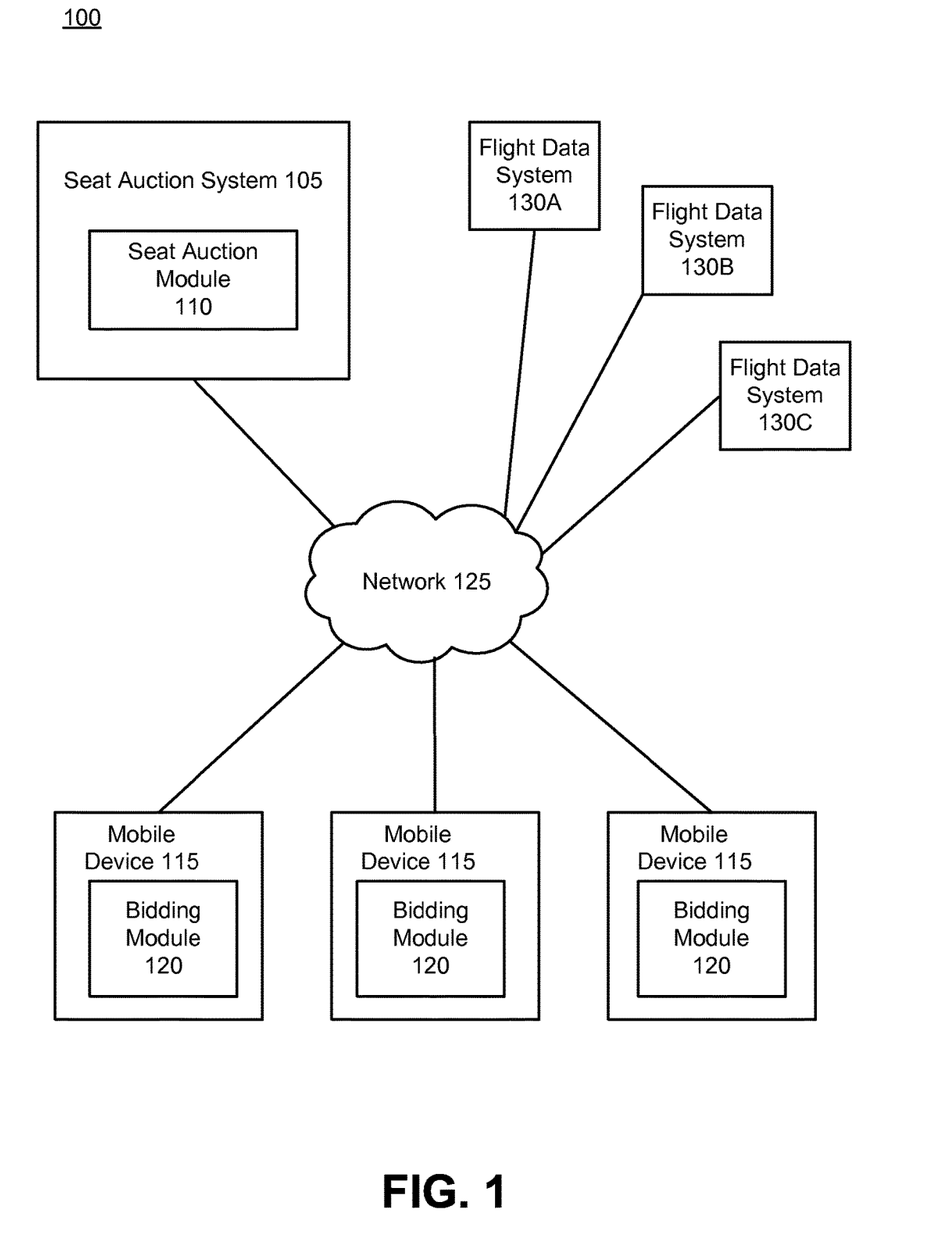
FIG. 1 is a high-level block diagram of a computing environment for a pre-boarding seat upgrade auction according to one embodiment.

FIG. 1 is a high-level block diagram of a computing environment for a pre-boarding seat upgrade auction according to one embodiment. A shown in FIG. 1, the computing environment 100 includes a seat auction system 105, and several flight data systems 130 (including 130A, 130B, and 130C), and several mobile devices 115 (including 115A, 115B, 115C) connected together through a network 125. Only three mobile devices 115 are shown in FIG. 1 to simplify and clarify the description. Embodiments of the computing environment 100 can have large numbers (e.g., hundreds, or thousands) of mobile devices 115 connected to the network 125.

The network 125 represents the communication pathways between the seat auction system 105, the flight data systems 130, and the mobile devices 115. In one embodiment, the network 125 is the Internet. The network 125 can also utilize dedicated or private communications links that are not necessarily part of the Internet. In one embodiment, the network 125 uses standard communications technologies and/or protocols. Thus, the network 125 can include wired or wireless links using technologies such as Ethernet, 802.11, integrated services digital network (ISDN), digital subscriber line (DSL), asynchronous transfer mode (ATM), 3G, LTE, etc. Similarly, the networking protocols used on the network 125 can include the transmission control protocol/Internet protocol (TCP/IP), the hypertext transport protocol (HTTP), the simple mail transfer protocol (SMTP), the file transfer protocol (FTP), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each flight data system 130 is one or more computing devices, such as server class computers or other types of computers. The flight data systems 130, either alone or collectively, can manage reservations for seats for airline flights and access to flight data. In one embodiment, flight data systems 130A and 130B are $3^{rd}$ party flight reservation systems (e.g. SABRE, FARELOGIX) that are not directly operated by the airlines but provide access to flight data and reservations. Flight data system 130C is an airline host system owned and operated by an airline (e.g. UNITED AIRLINES, AMERICAN AIRLINES) that controls flight data and reservation information for one particular airline.

In one embodiment, flight data systems 130A and 130B maintain real-time flight information including passenger manifests, and daily flight schedules for multiple flights for one or more airlines. Flight data system 130C generates, for the flights of a particular airline, seat information identifying open seats on a given airline flight that are available to be provided as upgrades during an auction. Flight data system 130C can also generate upgrade confirmations for seat upgrades for a flight once a winner(s) of the auction is identified. The seat auction system 105 can request any of this information from the appropriate flight data system 130, which then provide the requested information to the seat auction server 105 via the network 125. Additionally, these functions may be divided amongst the flight data systems 130 in a different manner and the flight data systems 130 may work in conjunction with each other to provide flight data and reservation information to the seat auction system 105.

The mobile devices 115 are handheld computing devices used by airline travelers that have already booked and have confirmed reservations for seats in a lower travel class (e.g. economy class seats) of an airline flight. Examples of mobile devices 115 are smart phones, personal digital assistants (PDA) or tablets. The mobile devices 115 may have a touch-screen display for displaying auction information and receiving traveler input during the course of a pre-boarding seat upgrade auction. The mobile devices 115 can communicate with the network 125 using wireless technology including but not limited to Wi-Fi, 3G or Long Term Evolution (LTE).

Each mobile device 115 include a bidding module 120 that communicates with the seat auction system 105 before, during, and after a pre-boarding seat upgrade auction so that the airline traveler can participate in the live pre-boarding seat upgrade auction, and is one means for performing these various functions. The term "module" refers to computer program logic utilized to provide the specified functionality a computing device, such as a mobile device 115 or seat auction system 105. Other embodiments of the seat auction system 105 and/or mobile device 105 can have different and/or other modules than the ones described here, and that the functionalities can be distributed among the modules in a different manner. In one embodiment, the bidding modules 120 are mobile bidding applications installed on the mobile devices 115 that are obtained from an app store, such as GOOGLE PLAY or the APPLE APP STORE.

The bidding module 120 is configured to receive from the seat auction system 105 information about the availability of a pre-boarding seat upgrade auction for a seat upgrade and present this information to an airline traveler. During the seat upgrade auction, the bidding module 120 receives auction bid inputs from a traveler and transmit those auction bids to the seat auction server 105. The bidding module 120 can also be configured to bid automatically on the behalf of the traveler, by receiving a maximum bid amount input by the traveler, and then incrementally increasing the traveler's bid until the maximum is reached. After the seat upgrade auction, the bidding module 120 receives information from the seat auction system 105 indicating whether or not the traveler won the seat auction. The information includes confirmation of the seat upgrade, including information identify the traveler's winning bid amount, seat assignment, and scannable boarding code.

The seat auction system 105 is a computing device, such as a server class computer(s) or other type of computer. The computing device includes least one processor, a memory, a storage device, a network adapter. The storage device is any non-transitory computer-readable storage medium, such as a hard drive, compact disk read-only memory (CD-ROM), DVD, or a solid-state memory device. The memory holds instructions and data used by the processor, including modules that are executed by the processor for providing some functionality. More specifically, program modules are stored on the storage device, loaded into the memory, and executed by the processor.

The seat auction system 105 includes a seat auction module 110 that manages the live online pre-boarding auctions for seat upgrades. The seat auction module 110 communicates with the flight data system(s) 130 to receive flight manifests and upgradable seat information about open seats in the airline flights that are available for auction on each of a plurality of airline flights on any given day. During operation, the seat auction system 105 will support multiple auctions concurrently, for many different flights. The following discussion will concentrate on the operation of a single auction.

Prior to boarding of a plane, the seat auction module 110 commences an auction for seat upgrades. The auction may begin at or after check-in time for the airline flight, which is typically twenty four hours before departure. The auction also ends before boarding time, such as 1 hour prior to departure (or just prior to boarding time). In one embodiment the start time is preferably 30 minutes before the boarding time and ends no more than 10 minutes before boarding time. Of course these specific times may be varied to optimize traveler participation, bidding revenue, and operating efficiency for the airline. Indicators of the traveler's locations, such as number of check ins and mobile device 115 location may also affect the auction start time.

During the auction, the seat auction module 110 receives auction bids from the mobile devices 115 for travelers that want to upgrade their seats to a better travel class, such as but not limited to, from economy class to business or first class. The auction is a live (i.e. real-time) online auction during which the seat auction module 110 repeatedly accepts bids throughout the auction, maintains a queue of bids, including one or more top bidders, and updates the mobile devices 115 with the status of the auction (e.g., each traveler's current bid, and the current top bidders) until the close of the auction. Once the auction is ended, the seat auction module 110 determines one or more winners of the auction. Confirmation of the seat upgrade is then sent to the mobile devices 115 of the winning travelers. Travelers who did not win the auction are likewise notified.

Beneficially, conducting the auction prior to boarding results in one or more travelers moving from their original seats to the upgraded seats, thereby making their original seats available for standby passengers, or overbooked travelers. As a result, the airline can achieve higher average occupancy for each flight, and reduce the expense arising from having to pay for travel vouchers for the overbooked or bumped travelers. Additionally, beginning the pre-boarding seat upgrade auction during a limited period prior to boarding incentivizes travelers to bid their true preferences for the seat upgrade. If the auction is started too early (e.g., weeks or days before), travelers will generally bid too low or will not be engaged in the auction, because they may still have time to book seats on another airline, change travel arrangements, and so forth. Similarly, conducting an auction after boarding also results in lower bids due to the inconvenience it imposes on travelers already seated: once seated a traveler mentally adopts the seat as his or her own, and is thus less likely to move. The live auction format additionally provides an interactive auction platform that increases the price that a traveler is willing to pay for the seat upgrade due to the competitive nature of a live auction. Further, as most modern day travelers own mobile devices, the seat upgrade auction will be accessible by a large group of travelers, which further increases traveler participation and allows bidding to continue until the flight is about to board.

In some embodiments, the seat auction system 105 may be a $3^{rd}$ party auction system operated by a $3^{rd}$ party that has a contractual arrangement with the airlines to auction seat upgrades on behalf of the airlines. In other embodiments, the seat auction system 105 may be owned and operated by one or more of the airlines.

The embodiments described herein can be used to upgrade seats from any lower travel class to any higher travel class. Examples of travel classes listed from lowest to highest include economy (sometimes referred to as coach class), economy plus (economy with greater legroom), business class and first class. Additionally, although the embodiments described herein for pre-boarding seat upgrades for airline flights, in other embodiments the principles described herein may be applied to pre-boarding seat upgrades for other transportation means, such as trains, boats, or spacecraft. Embodiments described herein may also be applied to seat upgrades for sporting events and concert events to upgrade seats for persons having already purchased tickets to those events.

Additionally, in other embodiments, the mobile devices 115 may be replaced with other computing devices, such as laptops, desktop computers, set-top boxes, etc. Further, in other embodiments the bidding module 120 may be a general purpose browser such as INTERNET EXPLORER or GOOGLE CHROME, executing client side scripting when in communication with the seat auction system 105.

Seat Auction Behavior

Figure 2:
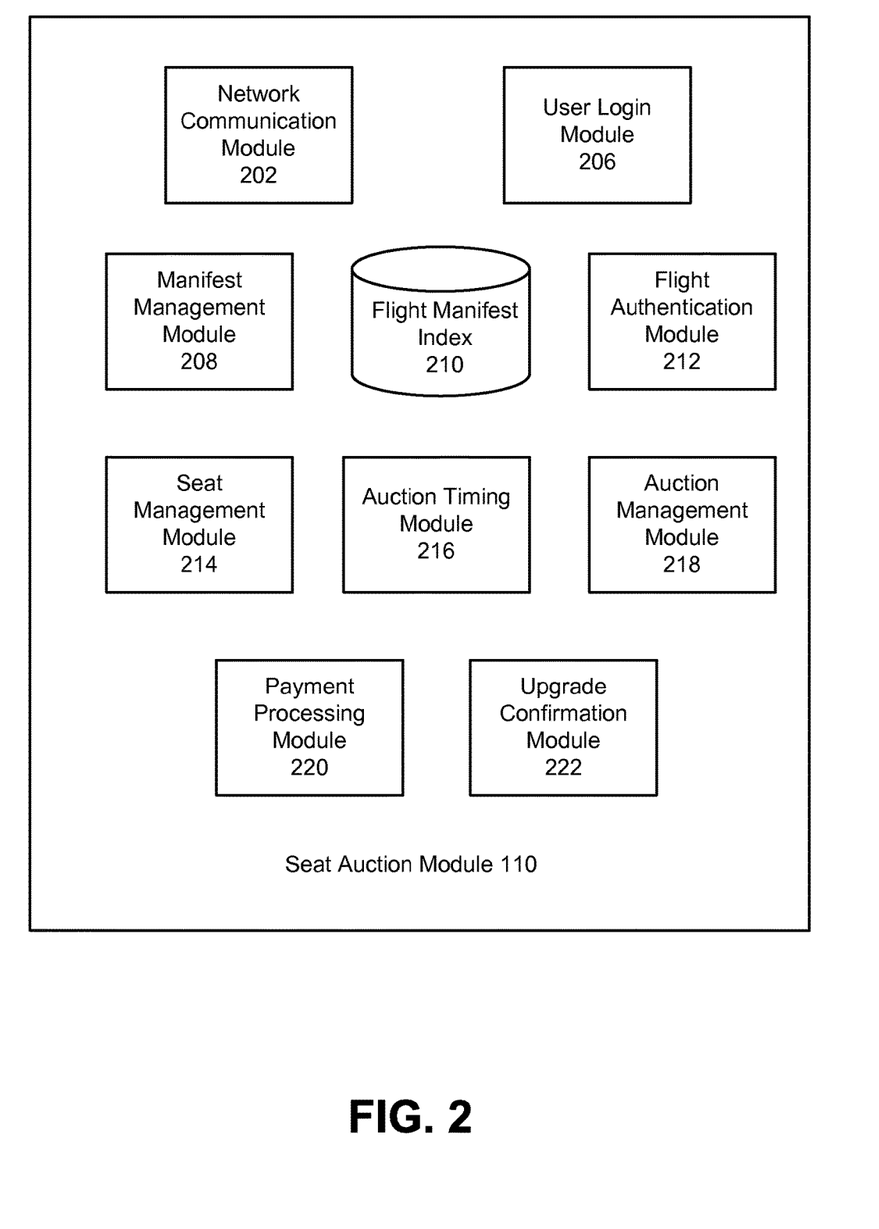
FIG. 2 is a block diagram of a seat auction module according to one embodiment.

FIG. 2 is a block diagram of a seat auction module 110 according to one embodiment. As shown in FIG. 2, illustrated is a network communication module 202, a user login module 206, a manifest management module 208, a flight manifest index 210, a flight authentication module 212, a seat management module 214, an auction timing module 216, an auction management module 218, a payment processing module 220 and an upgrade confirmation module 222. In other embodiments, there may be other modules that are not shown in FIG. 2 and the functionality described as being in one module may be distributed among the other modules.

The network communication module 202 interfaces with the network 125 for receiving and transmitting information with the mobile device(s) 115 and flight data system(s) 130, and is one means for performing this function. The network communication module 202 may act as an intermediary between the network 125 and the other modules of the seat auction module 110 that passes communications between the network 125 and the other modules of the seat auction module 110.

The user login module 206 verifies that the traveler is a registered user of the seat auction system 105 and/or keeps track of the traveler's activities in the seat auction system 105, and is one means for performing this function. The user login module 206 receives identifying login information for the airline travelers from the mobile devices 115. The identifying information includes a login name and password, and may include additional login information. In one embodiment, the traveler may have directly logged in to a social networking system (e.g. FACEBOOK or GOOGLE) through the mobile device 115. In this case, the bidding module 120 may generate a unique ID for the traveler after logging into the social networking system and transmit this unique ID to the user login module 206 as the identifying login information.

The flight manifest index 210 stores flight manifests for one or more airline flights, and provide access to this information to the other modules, and is one means for performing this function. The flight manifests include information such as a list of passengers on the flight, seat assignments of the passengers, flight confirmation numbers for the passengers, travel class (i.e. economy, first), fare restrictions, etc. Each flight manifest can also be stored in associated with other pertinent flight information, such as a flight number, check-in time, a departure time, a boarding time, departure airport, arrival airport, type of aircraft, etc. The flight manifests are generally derived from the flight manifests maintained by the flight data system(s) 130 and saved locally in the seat auction system 105 for faster access.

The manifest management module 208 manages and updates the information in the flight manifest index 210, and is one means for performing this function. The manifest management module 208 receives flight manifests from the flight data system(s) 130 and stores them into the flight manifest index 210. The manifest management module 208 can actively request the flight manifests from the flight data system(s) 130, or can receive the manifest information from time to time as a feed. In one embodiment, the manifest management module 208 receives a flight confirmation number and last name for a traveler from the mobile device 115. This flight confirmation number and last name are transmitted to the flight data system(s) 130 in order to retrieve the flight manifest for the entire airline flight associated with the flight confirmation number and last name. Once the flight manifest is received, it is stored into the flight manifest index.

The flight authentication module 212 verifies that a traveler has a confirmed reservation for an airline flight and identifies the airline flight for which a traveler has a confirmed reservation, and is one means for performing this function. The airline flight can be identified by accessing the flight manifest index 210 and matching flight authentication information (e.g. a flight confirmation number, a first name, and a last name of the traveler), to the manifests in the flight manifest index. The flight confirmation number can be a confirmation code that is assigned to a traveler after the traveler checks-in to a flight. If the flight authentication information matches the information in one of the flight manifests, the traveler is confirmed to have an existing reservation for that flight and the traveler is added to a list of travelers' eligible to participate in the pre-boarding seat upgrade auction for this specific flight. The generation of the eligible traveler list is one example of a transformative operation of the seat auction module. On the other hand, if the flight authentication information does not appear in one of the flight manifests, the manifest management module 208 may attempt to update the flight manifest index 210 by contacting the airline server.

In other embodiments the flight authentication module 214 may confirm whether the traveler has a confirmed reservation by transmitting a confirmation number and last name to a flight data system 130. The flight data system 130 processes the information and then returns information about the airline flight associated with the confirmation number.

The auction timing module 216 uses the flight manifest information to determine the boarding time for a specific flight, and uses the boarding time to determine the time at which the auction must be commenced, and is one means for performing this function. In one embodiment, the auction timing module 216 determines the start time as a pre-determined amount time prior to the boarding time or departure time of an airline flight. For example, the start time can be 24 hours prior to departure, which is inline with the check-in time for a flight when travelers can start checking in for a flight online. As another example, the start time can be 30 minutes prior to the boarding time which is in line with the amount of time (60 minutes) recommended for travelers to arrive at the airport for domestic flights. Since most airlines have online check-in as well, a 30 minute window will generally ensure an accurate estimate of the number of seats available for upgrades. Similarly, the end time can be determined as a pre-determined amount time prior to the boarding time or departure time of an airline flight. For example, the auction may end 1 hour prior to departure, 10 minutes prior to the boarding time, etc.

In one embodiment, the auction start time is determined based on the number of check-ins made in the airport. Once a predetermined percentage (e.g. 80%) of travelers have checked in at the airport and printed a boarding pass (either at the counter or kiosk), the auction may be started then (or a fixed number of minutes thereafter). In this mode, the number of online check-ins can also be considered (accounting for those travelers who check-in online and print their boarding passes remotely). For example, once 80% of all reserved travelers have checked in (both at the airport or online), then auction start time can be set (again, either immediately or some number of minutes thereafter). Finally, a combination of the boarding time, and check-in percentages can be used to establish the auction start time. For example, if 1 hour before the boarding time only 60% of the travelers have checked in, then the start time can be delayed until a larger percentage of travelers have checked in.

In one embodiment, the start time can be based on the location of the mobile devices 115. The mobile devices 115 can provide their location either directly (GPS or geo code) or indirectly (cell location) to the seat auction system 105. Using this location information, it can be determined as to whether a sufficient percentage of travelers reserved for the flight are near the airport. If the percentage of travelers near the airport is above a percentage (e.g., 50%), the auction start time can be set (again, either immediately or some number of minutes thereafter). Finally, a combination of the boarding time, and location information can be used to establish the auction start time.

In one embodiment, the auction start time can vary depending on whether the flight is an international flight or a domestic flight. More time may be allocated for international flights as opposed to domestic flights. For example, for international flights, the start time may be 4 hours prior to boarding, but for domestic flights the start time may be 2 hours prior to boarding. In other embodiments, the auction start time can be determined relative to the departure time instead of the boarding time.

The seat management module 214 determines, shortly before the auction start time, whether there are any seat upgrades available for auction on the traveler's airline flight. In one embodiment, whether seat upgrades are available is determined from seat upgrade information received from a flight data system 130. The seat upgrade information indicates whether there are any open seats in the airline flight that can be upgraded to during an auction. As noted, this information is likely to be current, based on fact that most passengers who are travelling will have already checked in with the airline, and obtained their boarding passes. Examples of seat upgrade information may include a list of seat numbers (e.g. 4A, 3A) in a first class cabin that are open and available for auction. Other examples of seat upgrade information include a number that indicates how many seats are available (e.g. 2 seats available) for auction in the first class cabin.

Although there may be many open unsold seats in a first class cabin, not all of the open seats may be available for auction. An airline may only release a portion of the open seats to the seat auction system 105 while retaining the rest of the open seats for its frequent flyer program. This allocation of seats between the seat auction system 105 and the frequent flyer program is decided by a flight data system 130, which then informs the seat management module 214 of the seats available for upgrade during an auction. The seat management module 214 thus maintains a specific list of the seats or number of seat openings that are available for upgrade on each specific flight. This is another example of a transformative operation.

A notification of the availability of a seat upgrade auction for the flight is then transmitted to the mobile devices 115 of each eligible traveler to notify the travelers of the auction. The notification may include the auction start time to notify the travelers of when the auction is to begin, flight number, and other information about the auction. The auction timing module 216 may also transmit periodic notifications to the mobile devices 115 that remind the travelers of an impending pre-boarding seat upgrade auction. The notification can be transmitted through a variety of messaging channels, such as but not limited to e-mail, direct messaging to an bidding application installed on the mobile devices, short message service (SMS), etc.

In one embodiment, a notification of the availability of a seat upgrade auction is transmitted to the mobile device 115 once the traveler checks in for a flight through the traveler's mobile device 115. The traveler is then presented with a prompt that notifies the traveler of the availability of the seat upgrade auction so that the traveler can easily begin bidding on a seat upgrade.

The auction management module 218 handles auction behavior of the pre-boarding seat upgrade auction, and is one means for performing this function. The auction management module 218 commences the auction at the designated auction start time, and initiates a countdown timer corresponding the duration of the auction. The auction management module 218 further initiates a bid queue into which bids are to be received, in FIFO order, based on a timestamp of when the bids were received by the seat auction server 105. The module 218 begins accepting auction bids into the bid queue for the seat upgrade(s) from the mobile devices 115 of travelers that have confirmed reservations for the flight.

The auction management module 218 maintains a leaderboard, which is a list of travelers bidding on the one or more available seat upgrades ordered by the amount of their bids. The leaderboard for the auction is updated as the bids are received into the bid queue. From time to time, the leaderboard, or a portion thereof, such as the top 3 bidders, is transmitted to the mobile devices 115 of the travelers participating in the pre-boarding seat upgrade auction. The leaderboard may also include the current bid amounts for one or more of the highest bidders. Travelers wishing to increase their position in the auction may submit higher bid amounts to push themselves higher on the leaderboard, in effect competing with other travelers in real-time for the highest position on the leaderboard. As the seat-upgrade auction is a live online auction, bids are constantly being received and the leaderboard is constantly being updated throughout the course of the auction. If there are multiple seat upgrades up for auction, the leaderboard may include each of the leading bidders that is in a winning position for the available seat upgrades.

In one embodiment, a display device is located at the boarding gate for the airline flight, for example the display monitors typically present, and which display flight information, boarding times, departure times, and the like. In this embodiment, the auction management module 218 also transmits the leaderboard to the display device for display on the display device, allowing both the bidding travelers and others to observe the auction live in real time. This increases the level of excitement in the auction, which can lead to increased bidding by the travelers, and thus increased revenue for the airline.

The auction management module 218 may restrict the amount of the bids that travelers can make. In one embodiment, the auction management module 218 only allows travelers to make bids that are higher than the lowest winning bid. In one embodiment, the auction management module 218 only allows travelers to make bids that are higher than the highest existing bid by any traveler. The auction management module 218 may also restrict the increase in each bid to bid increments, such as a bid increment of $5. For example, if the traveler's current bid is $65, the traveler's next bid may automatically be set to $70. The bid increment may increase as the amount of the highest bid increases.

Upon receiving a bid from a mobile device 115, the auction management module 218 determines whether the received bid is sufficient to wine one of the available seat upgrades. The auction management module 218 also transmits information to the mobile devices 115 informing the traveler of whether the bid is currently sufficient to win one of the available seat upgrades. If a traveler is subsequently outbid, the auction management module 218 also transmits a notification to the mobile device 115 notifying the traveler that the traveler is outbid.

At expiration of the countdown time, the auction management module 218 ends (i.e. terminates) the bidding process such that no more bids can be accepted. The auction management module 218 then determines the winner(s) of the seat upgrade(s) from the leaderboard. As noted, there may be more than one winner, depending on the number of seat upgrades that were available for auction. For example, if three seat upgrades were available for auction, the top three bidders would be selected as winners of the seat upgrades. Alternatively, a second price auction format may be used, so that the top bid pays the price bid by the second placed bidder, and so forth down the leaderboard. The auction management module 218 stores a list of the winner(s) of the auction, including their winning bid amounts.

In one embodiment, the bids can only be made using monetary values (e.g., dollars). In another embodiment, the travelers can use their frequent flier miles to bid on the seat upgrade, which the auction management module 218 translates into a monetary value. For example, 1,000 frequent flier miles can be equivalent to 100 dollars for auction purposes, or the like. Additionally, the bids can also be made with a combination of frequent flier miles and real monetary values.

The auction management module 115 generally manages the auction as a live online auction during which travelers openly bid against each other, which is similar to an English auction. In other embodiments the auction may be in an auction format that is not a live auction, such as a sealed first-price auction, silent auction, etc.

The payment processing module 220 processes payments for travelers that are winners of the seat upgrades, and is one means for performing this function. The payment processing module 220 receives payment information (e.g. credit card numbers) from the mobile devices 115 prior to the seat-upgrade auction and stores this information. The payment processing module 220 then accesses the winner list to identify the winning travelers and their winning bid amounts, and then looks up for each identified traveler their stored payment information. The payment processing module 220 then processes the payments using the payment information and bid amounts. If the payment information is in the form of a credit card, the payment procession module 220 may put an authorization hold on the card prior to allowing a traveler to bid to be sure that the traveler has the funds to pay for the seat upgrade. The payment processing module 220 may also store payment information for travelers that are repeat users of the seat auction system 105.

The upgrade confirmation module 222 confirms seat upgrades for winners of the seat upgrades, and is one means for performing this function. When a winner of a seat upgrade is determined, the upgrade confirmation module 222 transmits information about the winning traveler (e.g., flight confirmation number, last name, request to adjust seats) to one of the flight data system 130 so that the flight data system 130 can update seat assignments for the airline flight. The flight data system 130 also generates and returns confirmation information confirming the upgrade. In one embodiment, the confirmation information is a scannable boarding code that can be displayed on the screen of the traveler's mobile device 115 and scanned as a boarding pass at the airline gate. Examples of scannable boarding codes include quick response (QR) codes and barcodes. The upgrade confirmation module 222 then forwards the confirmation information to the mobile device 115 as confirmation of the seat upgrade.

Figure 3:
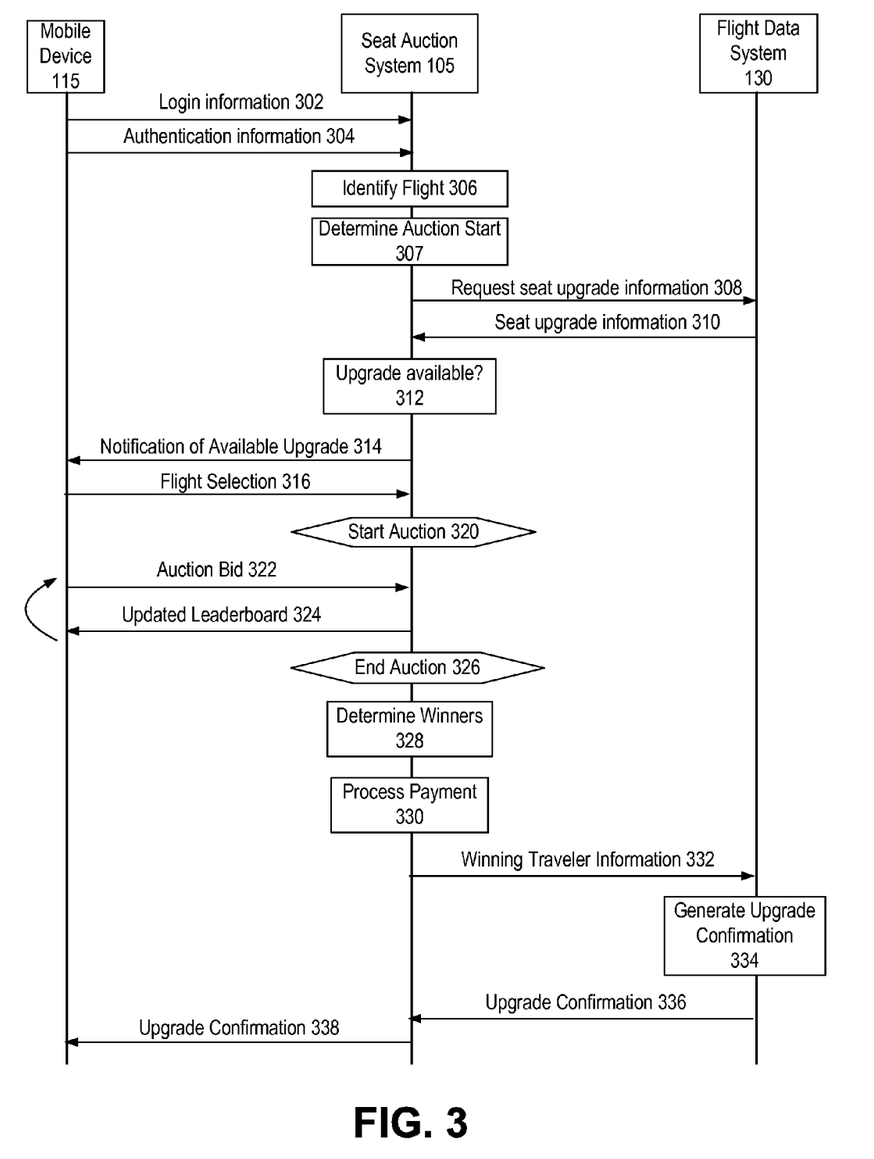
FIG. 3 is an interaction diagram between components of the computing environment of FIG. 1 according to one embodiment.

FIG. 3 is an interaction diagram between components of the computing environment of FIG. 1 according to one embodiment. Initially, the mobile device 115 transmits identifying login information 302 for a traveler to the seat auction system 105. The identifying login information can be, for example, a user name and password, or a unique identifier that has been generated by the mobile device 115 after the mobile device 115 logs into a social networking system. Using the identifying information 302, the seat auction system 105 can verify the user and then begin communicating with the mobile device 115.

The mobile device 115 then transmits flight authentication information 304 (e.g., flight confirmation number, last name, first name) for a traveler to the seat auction system 105. The seat auction system 105 uses the flight authentication information 304 to verify that the traveler has a reservation for a flight and to identify 306 an airline flight that the traveler has a confirmed reservation for. In one embodiment, the flight authentication information 304 can be matched against a flight manifest index 210 or communicated to the flight data system 130 to obtain verification that the traveler has a confirmed reservation for a particular flight.

The seat auction system also determines 307 a start time for the auction based on the boarding time. The start time is a pre-determined amount of time prior to the boarding time, as explained above.

The client may also request 308 seat upgrade information from the flight data system 130 for the airline flight. In response, the flight data system 130 provides the seat upgrade information 310 indicating open seats (e.g. specific seats, number of seats) that are available to be auctioned during a pre-boarding seat upgrade auction.

Using the seat upgrade information 310, the seat auction system 105 determines whether any seat upgrades are available for auction. If seats are available for upgrade in a flight, a notification 314 that the flight includes available seat upgrades for the pre-boarding seat upgrade auction is transmitted to the mobile device 115. The notification 314 may be communicated along with other information, such as start time information specifying the start time for the pre-boarding seat upgrade auction. The notification can be displayed at the mobile device 115 to the traveler, who then selects a flight that has seat upgrades available for the pre-boarding seat upgrade auction. The flight selection 316 is then received by the seat auction system 105.

The seat auction system 105 then starts 320 (i.e. commences) the pre-boarding seat upgrade auction at the determined start time. As the pre-boarding seat upgrade auction proceeds, the seat auction system 105 receives auction bids 322 from the mobile devices 115, updates the leaderboard with the auction bits 322, and then transmits the updated leaderboard 324 to the mobile devices 115. This process is repeated throughout the course of the pre-boarding seat upgrade action to create the effect of a real-time, live online auction. At the end of the auction, the seat auction system 105 closes the auction 326, determines 328 one or more winners of the seat upgrades, and processes 330 payment for the winning travelers.

Once payment has been processed and confirmed, the seat auction system 105 transmits winning traveler information 332 identifying the travelers that have won the seat upgrades to the flight data system 130. The airline reservation updates the seat assignments for the winning travelers so that the winning travelers are bumped into a better travel class, such as first class. The flight data system 130 also generates upgrade confirmations 334 for the winning travelers and transmits the upgrade confirmations 336 to the seat auction system 105. The seat auction system 105 then relays the upgrade confirmations 338 to the respective mobile devices 115 by transmitting the upgrade confirmation 338 to the mobile devices 115.

Figure 4A:
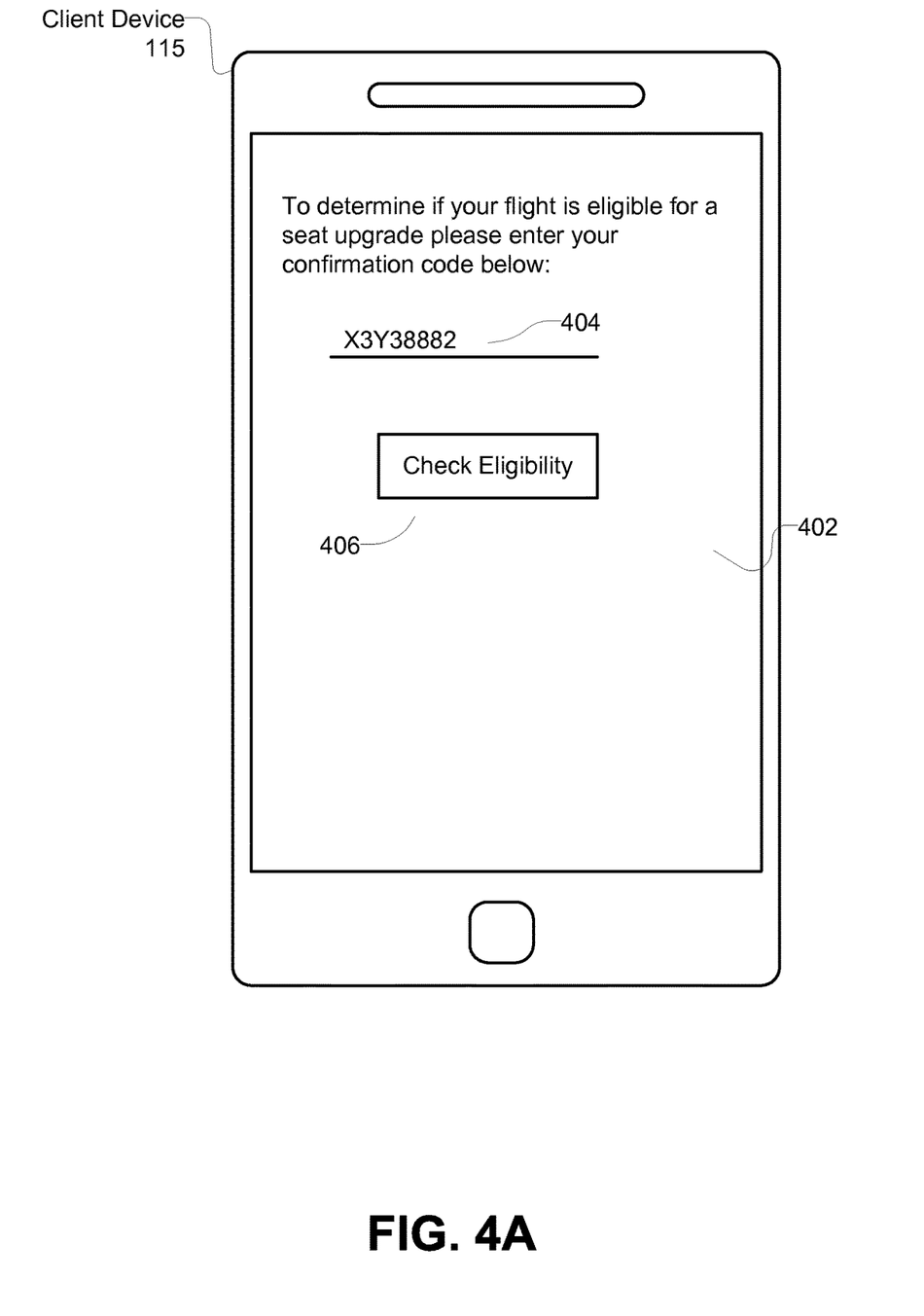
FIG. 4A is a user interface for entering a flight confirmation code according to an embodiment.

In one embodiment, the mobile device 115 executes a bidding module 120 in the form of a mobile application that interacts with the seat auction system 105 to provide travelers access to the system 105. FIG. 4A is a user interface 402 of the mobile application, for entering a flight confirmation code displayed on a mobile device 115 according to an embodiment. The user interface 402 includes a message indicating that the user should enter a flight confirmation code. The user interface 402 includes a text entry section 404 for the traveler to enter a flight confirmation code. The user interface 402 also includes a check eligibility button 406 that, when selected, sends the flight confirmation code 404 to the seat auction system 105.

Figure 4B:
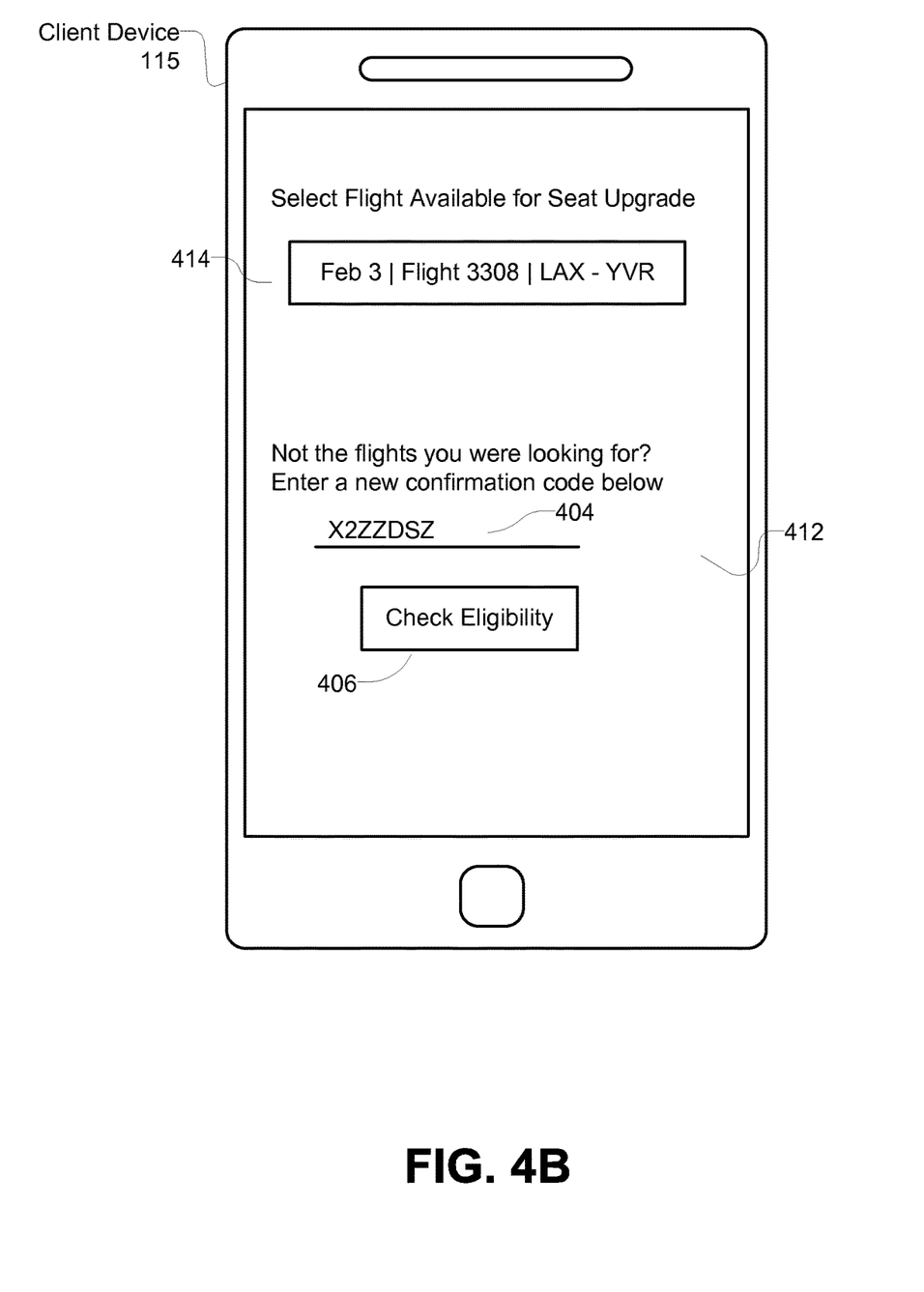
FIG. 4B is a user interface for selecting a flight for a seat upgrade according to an embodiment.

FIG. 4B is a user interface 412 of the client application, for selecting a flight for a seat upgrade displayed on a mobile device 115 according to an embodiment. The user interface 402 includes a notification 414 of a flight that is available for a seat upgrade during a pre-boarding seat upgrade auction. The notification 414 includes information about the flight, such as the date of the flight, the flight number, the departure point and the destination point. In other embodiments, the notification 414 can include different types of information. The notification 414 is shown as a selectable button that, when selected, informs the seat auction system 415 that the flight has been selected. The user interface 412 also includes a check eligibility button 406 and a text entry section 404 for a different flight confirmation code.

Figure 4C:
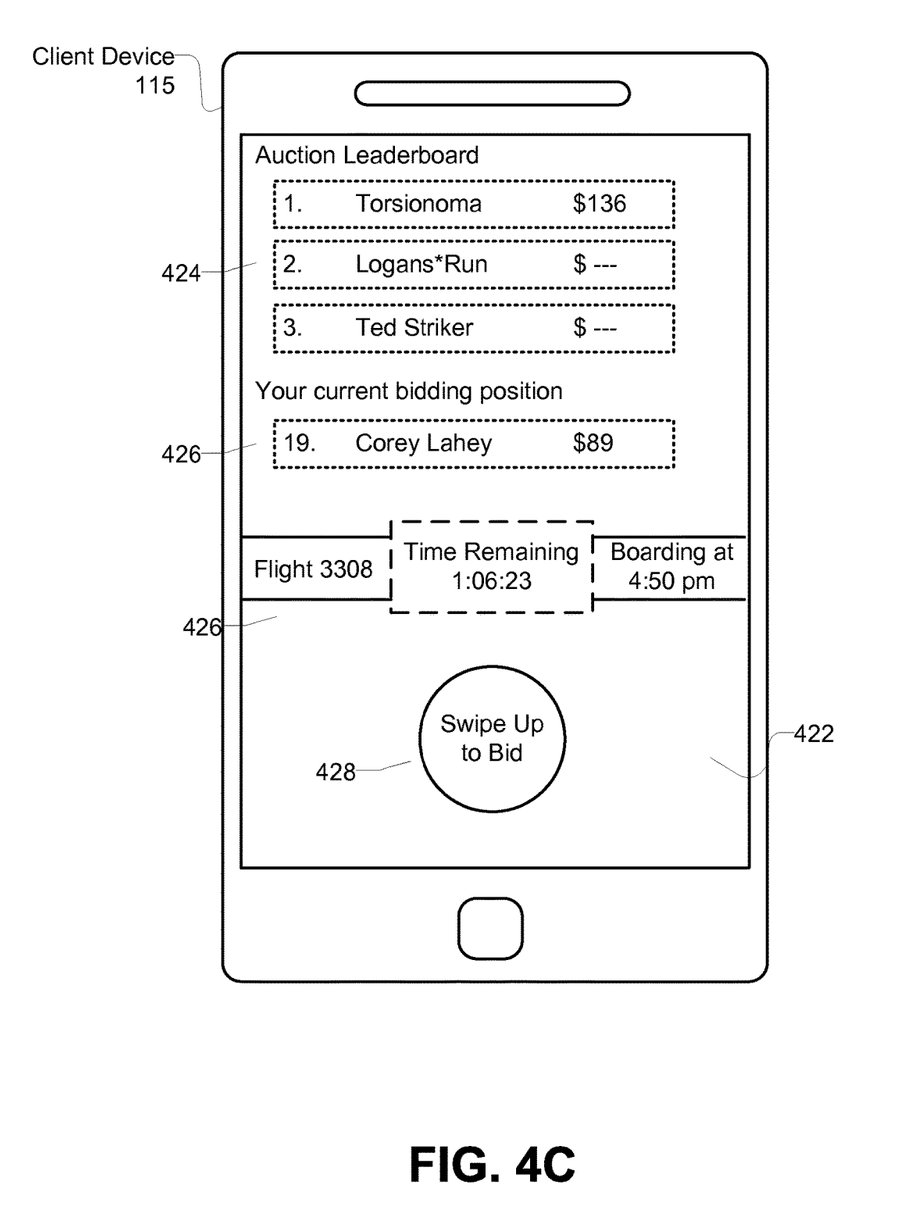
FIG. 4C is a user interface for bidding during a pre-boarding seat upgrade auction according to an embodiment.

FIG. 4C is a user interface 422 of the client application, for receiving bids during a pre-boarding seat upgrade auction displayed on a mobile device 115 according to an embodiment. This user interface 422 is displayed during the pre-boarding seat upgrade auction. The user interface 422 includes a leaderboard that lists the three current leading bidders of the auction. The leaderboard is updated in real time as new bids are entered by the travelers. The bid amount for the top bidder is shown in the leaderboard 424, but the bids for the other bidders are hidden. In other embodiments the leaderboard may have a different appearance, such as showing larger number of leading bidders or specific bid amounts for each of the top bidders.

The user interface 422 includes information 426 about the current bidding standing of the traveler using this mobile device 115 relative to the other travelers that are bidding for the same seat upgrades. The information 426 also includes the traveler's current bid amount.

The user interface 422 further includes flight information, such as the flight number, the time remaining in the pre-boarding seat upgrade auction, and the boarding time of the flight.

The user interface 422 also includes an interactive bidding element 428. When the traveler swipes the bidding element 428 with a finger, the mobile device 115 transmits a bid to the seat auction system 105. The bid may be an incremental increase over the traveler's current bid of $80, such as a bid of $90. Alternatively, the bid may be a bid that is an incremental increase over the leader's bid of $136. In other embodiments, the traveler may select from several different bid increments, such as $5, $10, $15, or $20. Additionally, the traveler may configure the bidding module 120 with a maximum bid amount, which is the most they are willing to pay for a seat upgrade. During bidding the traveler's current bid is increased by a bid increment each time the traveler is outbid by another, up until the maximum bid amount is reached.

In other embodiments, other types of interactive bidding elements 428 may be used to enter bids. After a bid is processed by the seat auction system 105, the leaderboard may be updated to reflect any changes in the leaders of the pre-boarding seat upgrade auction.

Figure 4D:
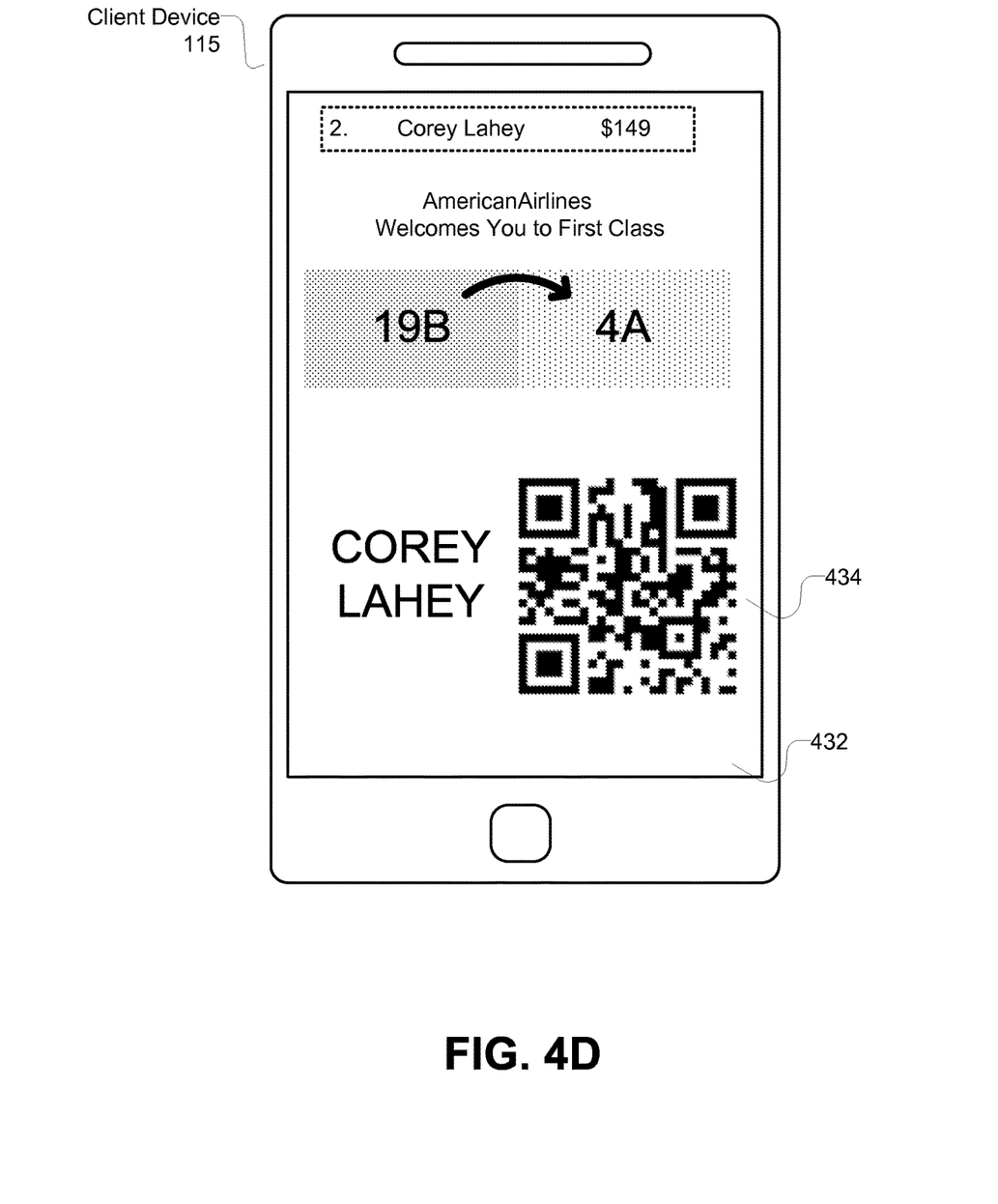
FIG. 4D is a user interface confirming a seat upgrade according to an embodiment.

FIG. 4D is a user interface 432 of the client application, for confirming a seat upgrade displayed on a mobile device 115 according to an embodiment. The user interface 432 includes a scannable QR code 434 that serves as confirmation of the seat upgrade. The scannable QR code 434 can be used as an electronic boarding pass and scanned at the airline gate when boarding the airplane. The user interface 432 also includes other information, such as the price paid for the seat upgrade and the new seat assignment.

Additional Configuration Considerations

The foregoing description of the embodiments of the disclosure has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code/instructions, which can be executed by a computer processor for performing any or all of the steps, operations, or processes described herein.

Embodiments of the disclosure may also relate to an apparatus for performing the operations herein. This apparatus may be specially constructed for the required purposes, and/or it may comprise a general-purpose computing device selectively activated or reconfigured by computer instructions stored in the computer. Such a computer instructions may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability and configured to execute the computer instructions.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:
providing a mobile bidding application to a plurality of travelers for installation on respective mobile devices of the travelers, the mobile bidding application executable on a mobile device to display a first user interface to receive a bid for a seat upgrade;

receiving, at a server, from the mobile device of one of the travelers, a flight confirmation code for the traveler for an airline flight at an airport;

verifying, by comparing the flight information code to a flight manifest for the airline flight, that the traveler has a confirmed reservation for the airline flight;

determining from a flight data system that the airline flight that has not yet begun boarding at the airport;

receiving, from the mobile bidding applications of the mobile devices, GPS location information identifying current locations of the mobile devices of the travelers that have reservations for the airline flight;

receiving, from the flight data system, flight reservation information comprising a number of the travelers with reservations for the flight;

determining, from the current locations of the mobile devices of the plurality of travelers that have reservations for the flight, a number of the travelers who are at a location of the airport;

determining, from the number of travelers that have reservations for the flight and the number of travelers that have reservations for the flight and are at the location of the airport, a percentage of the travelers that have reservations for the flight that are at the location of airport;

comparing the determined percentage of travelers to a threshold percentage;

determining an auction start time of a live online pre-boarding auction for at least one seat upgrade for the airline flight in response to the determined percentage being above the threshold percentage, the auction start time being at or after check-in time for the airline flight but prior to the boarding time of the airline flight;

beginning the live online pre-boarding auction for the at least one seat upgrade at the auction start time;

receiving, during the live online pre-boarding auction, a plurality of bids for the at least one seat upgrade from the first user interface of the mobile bidding applications of the plurality of mobile devices of travelers that have reservations for the airline flight;

transmitting, during the live online pre-boarding auction, information to the mobile bidding application of at least each of the travelers providing a respective bid, the information identifying one or more highest bidding travelers in the live online pre-boarding auction and amounts bid by the one or more highest bidding travelers, wherein the information is displayed in the first user interface of the mobile bidding application of at least each of the travelers providing the respective bid;

updating, during the live online pre-boarding auction, the information identifying the one or more highest bidding travelers as the bids are received, wherein the updated information is displayed in the first user interface of the mobile bidding application of at least each of the travelers providing the respective bid;

ending the live online pre-boarding auction prior to the boarding time of the airline flight;

determining, after ending the auction and prior to the boarding time, which traveler that submitted at least one bid is a winner of the at least one seat upgrade based on the plurality of bids; and responsive to determining which traveler is the winner of the at least one seat upgrade, transmitting, prior to the boarding time, a seat upgrade confirmation to the mobile bidding application of the mobile device of the traveler that is determined to be the winner.

2. The method of claim 1, wherein the mobile bidding application is executable to display a second user interface to receive the flight confirmation code, and the server receives the flight confirmation code input by a traveler in the second user interface of the mobile bidding application.

3. The method of claim 1, further comprising:
receiving seat upgrade information from the flight data system identifying at least one seat on the airline flight available for auction; and
notifying the traveler of the online pre-boarding auction for the at least one seat upgrade responsive to the seat upgrade information indicating that there are seats on the airline flight available for auction.

4. The method of claim 1, further comprising:
transmitting, prior to the boarding time, winning traveler information to the flight data system responsive to determining which traveler is the winner of the seat upgrade, the winning traveler information identifying the traveler that is determined to be the winner of the at least one seat upgrade; and
receiving the seat upgrade confirmation from the flight data system, the flight data system generating the seat upgrade confirmation based on the winning traveler information,
wherein the seat upgrade confirmation is transmitted, prior to the boarding time, to the mobile device of the traveler that is determined to be the winner responsive to receiving the seat upgrade confirmation from the flight data system.

5. The method of claim 1, wherein transmitting, prior to the boarding time, the seat upgrade confirmation comprises:
transmitting a scannable boarding code for an upgraded seat on the airline flight responsive to determining which traveler is the winner of the at least one seat upgrade.

6. The method of claim 1, further comprising:
notifying the traveler of the live online pre-boarding auction for the at least one seat upgrade by transmitting notification information to the mobile device of the traveler.

7. The method of claim 1, further comprising:
notifying the traveler of the auction start time of the live online pre-boarding auction for the at least one seat upgrade by transmitting start time information to the mobile device of the traveler.

8. The method of claim 1, wherein the auction end time is determined to be a pre-determined amount of time prior to the boarding time or a departure time of the airline flight.

9. The method of claim 1, wherein at least one of the bids for the at least one seat upgrade received during the live online pre-boarding auction is a bid made with frequent flier miles.

10. A system, comprising:
a non-transitory computer-readable medium storing instructions for:
providing a mobile bidding application to a plurality of travelers for installation on respective mobile devices of the travelers, the mobile bidding application executable on a mobile device to display a first user interface to receive a bid for a seat upgrade;
receiving, at a server, from a mobile device of one of the travelers a flight confirmation code of the traveler for an airline flight at an airport;

verifying, by comparing the flight information code to a flight manifest for the airline flight, that the traveler has a confirmed reservation for the airline flight;

determining from a flight data system that the airline flight that has not yet begun boarding at the airport;

receiving, from the mobile bidding applications of the mobile devices, GPS location information identifying current locations of the mobile devices of the travelers that have reservations for the airline flight;

receiving, from the flight data system, flight reservation information comprising a number of the travelers with reservations for the flight;

determining, from the current locations of the mobile devices of the plurality of travelers that have reservations for the flight, a number of the travelers who are at a location of the airport;

determining, from the number of travelers that have reservations for the flight and the number of travelers that have reservations for the flight and are at the location of the airport, a percentage of the travelers that have reservations for the flight that are at the location of airport;

comparing the determined percentage of travelers to a threshold percentage;

determining an auction start time of a live online pre-boarding auction for at least one seat upgrade for the airline flight in response to the determined percentage being above the threshold percentage, the auction start time being at or after check-in time for the airline flight but prior to the boarding time of the airline flight;

beginning the live online pre-boarding auction for the at least one seat upgrade at the auction start time;

receiving, during the live online pre-boarding auction, a plurality of bids for the at least one seat upgrade from the first user interface of the mobile bidding applications of the plurality of mobile devices of travelers that have reservations for the airline flight;

transmitting, during the live online pre-boarding auction, information to the mobile bidding application of at least each of the travelers providing a respective bid, the information identifying one or more highest bidding travelers in the live online pre-boarding auction and amounts bid by the one or more highest bidding travelers, wherein the information is displayed in the first user interface of the mobile bidding application of at least each of the travelers providing the respective bid;

updating, during the live online pre-boarding auction, the information identifying the one or more highest bidding travelers as the bids are received, wherein the updated information is displayed in the first user interface of the mobile bidding application of at least each of the travelers providing the respective bid;

ending the live online pre-boarding auction prior to the boarding time of the airline flight;

determining, after ending the auction and prior to the boarding time, which traveler that submitted at least one bid is a winner of the at least one seat upgrade based on the plurality of bids; and responsive to determining which traveler is the winner of the at least one seat upgrade, transmitting, prior to the boarding time, a seat upgrade confirmation to the mobile bidding application of the mobile device of the traveler that is determined to be the winner; and a processor to execute the instructions.

11. The system of claim 10, the instructions further comprising instructions for:

transmitting, prior to the boarding time, winning traveler information to the flight data system responsive to determining which traveler is the winner of the seat upgrade, the winning traveler information identifying the traveler that is determined to be the winner of the at least one seat upgrade; and receiving the seat upgrade confirmation from the flight data system, the flight data system generating the seat upgrade confirmation based on the winning traveler information, wherein the seat upgrade confirmation is transmitted, prior to the boarding time, to the mobile device of the traveler that is determined to be the winner responsive to receiving the seat upgrade confirmation from the flight data system.

12. The system of claim 10, wherein transmitting, prior to the boarding time, the seat upgrade confirmation comprises:

transmitting a scannable boarding code for an upgraded seat on the airline flight responsive to determining which traveler is the winner of the at least one seat upgrade.

13. The method of claim 1, further comprising:

transmitting, to a display monitor that is separate from the mobile devices and located at a boarding gate for the airline flight during the live online pre-boarding auction, the information identifying one or more highest bidding travelers in the live online pre-boarding auction and amounts bid by the one or more highest bidding travelers.

14. The method of claim 1, further comprising:

determining a number of seat upgrades available for auction, wherein beginning the live online pre-boarding auction for the at least one seat upgrade at the auction start time comprises beginning the live online pre-boarding auction for the at least one seat upgrade at the auction start time responsive to determining the number of seat upgrades available for auction.

15. The method of claim 1, further comprising:

wherein the auction start time is further determined based on the boarding time or a departure time for the airline flight.

16. The method of claim 1, further comprising:

determining a number of travelers that have checked in for the airline flight;

wherein the auction start time is further determined based on the number of travelers that have checked in for the airline flight.

17. The method of claim 1, wherein the first user interface includes an interactive bidding element, and the plurality of bids for the at least one seat upgrade are generated responsive to respective finger swipes of the interface bidding element.

18. The method of claim 1, wherein the mobile seat upgrade confirmation is displayed in a second user interface of the mobile bidding application of the mobile device of the traveler that is determined to be the winner.

19. The system of claim 10, the instructions further comprising instructions for the mobile bidding application to display a second user interface to receive the flight confirmation code input by the traveler and transmit the received flight confirmation code to the server.

20. The method of claim 1, wherein the plurality of bids received from the first user interface includes at least one bid generated in response to swiping of an interactive bidding element in the first user interface.

* * * * *